Figure 1:
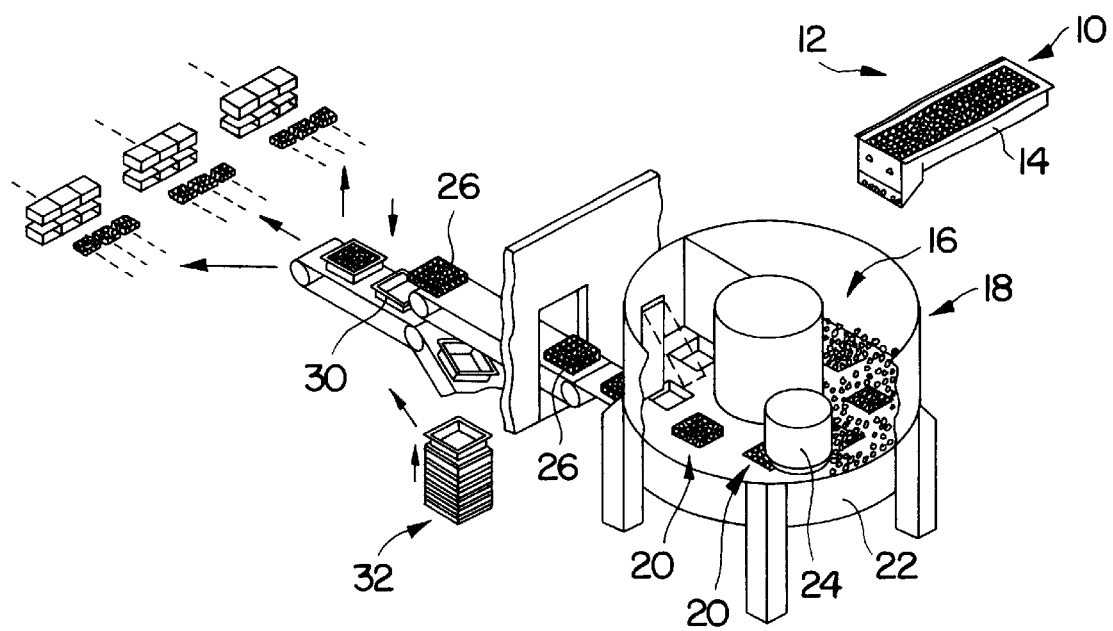

United States Patent [19]
Emberger et al.

[11] Patent Number: 5,958,487
[45] Date of Patent: Sep. 28, 1999

[54] PROCESS FOR PRODUCING A LUMPY MEAT PRODUCT

[75] Inventors: Harald Emberger, Mappirly Park, United Kingdom; Yvonne Siegmund, Langwedel-Hagen-Grinden, Germany; Jürgen Luttmann; Roland Stein, both of Kirchlinteln, Germany; Gebhard Kregel, Visselhoevede-Ottigen, Germany; Peter Kalisch, Bremen, Germany; Meinhard Protz, Bonlitz, Germany; Theo Langen, Kirchweye, Germany

[73] Assignee: Effem GmbH, Verden/Aller, Germany

[21] Appl. No.: 08/687,566

[22] PCT Filed: Jan. 13, 1995

[86] PCT No.: PCT/DE95/00054

§ 371 Date: Nov. 7, 1996

§ 102(e) Date: Nov. 7, 1996

[87] PCT Pub. No.: WO95/21541

PCT Pub. Date: Aug. 12, 1995

[30] Foreign Application Priority Data

Feb. 9, 1994 [DE] Germany ............... 44 04 083

[51] Int. Cl.$^6$ ............... A23L 1/31; A23L 3/36; A23K 1/10
[52] U.S. Cl. ............... 426/129; 426/246; 426/393; 426/397; 426/512; 426/524; 426/574; 426/805
[58] Field of Search ............... 426/512, 805, 426/129, 246, 574, 393, 397, 524

[56] References Cited

U.S. PATENT DOCUMENTS 3,677,167  7/1972  Berg ............... 424/512
4,929,456  5/1990  Bejarano-Wallens et al. ............... 426/99
5,314,705  5/1994  Hansson ............... 426/574

FOREIGN PATENT DOCUMENTS

| 533 959 | 3/1993 | European Pat. Off. |
| 58-212768 | 3/1984 | Japan. |
| 61-63262 | 4/1986 | Japan ............... A23L 1/31 |
| 61-192265 | 8/1986 | Japan ............... A32L 1/317 |
| 4-088967 | 7/1992 | Japan. |
| 1213929 | 11/1970 | United Kingdom. |
| 2132974 | 7/1984 | United Kingdom. |

Primary Examiner—Frank C. Eisenschenk
Assistant Examiner—Mary K Zeman
Attorney, Agent, or Firm—Fitzpatrick, Cella, Harper & Scinto

[57] ABSTRACT

Process for producing a meat product, such as an animal food, particularly for domestic pets or the like, comprising substantially lumpy meat material on the one hand and a substantially liquid gravy on the other and which is filled into a container, such as a shell pack, tin can, etc., in which the meat raw material is cut up in frozen form to meat lumps, together with the gravy is filled into a base of the container and finally with the container base is connected in a substantially liquid and gas-tight manner a container top and in which a sterilization process takes place, characterized in that both the meat material, comprising the meat lumps, optionally accompanied by the addition of prefabricated moulded pieces with a meat or vegetable base, and the sauce or gravy, the latter in granule form, are compression moulded to a shaped article in frozen, solid, quasi-dry state and as such introduced into the base, as well as meat product produced by this process.

21 Claims, 1 Drawing Sheet

PROCESS FOR PRODUCING A LUMPY MEAT PRODUCT

The invention relates to a process for producing a meat product, such as animal food, more particularly intended for pets or the like, comprising substantially lumpy meat material on the one hand and a substantially liquid sauce or gravy on the other and filled into a pack, such as a shell pack, tin can, film pack, etc., in which the meat raw material is cut up into meat lumps and together with the gravy is introduced into the packing material, such as a base of a container comprising a base and a top and finally the packing material is processed to a substantially liquid and gas-tight pack and a sterilization process is performed.

Meat products of the aforementioned type, such as are in particular used for the feeding of pet dogs or cats, have hitherto e.g. been produced in such a way that the meat raw material is cooled to approximately $-5°$ C. and is then cut up at this temperature and then the meat material comprising the thus produced meat lumps and optionally accompanied by the addition of prefabricated meat and/or vegetable-based shaped pieces are filled into the base of the container, e.g. a known shelf or tray pack, which can e.g. be produced by the deep drawing of coated sheet aluminium. As soon as the solid ingredients have been filled into the base the sauce or gravy is added, before fitting the top and the connection thereof with the base in a substantially gas and liquid-tight manner, e.g. by using a covering foil or film. It is known that the gravy can be mixed with the meat material prior to introduction into the base. In any case the gravy which, in both the known process and that according to the invention can contain various condiments, passes into the base in a liquid or at least flowable state, with a varyingly high viscosity.

Even in the case of a precise volume or weight dosing of the material to be introduced into the base and comprising a lumpy and a liquid phase, particularly as a result of the high throughput of modern filling plants, it is unavoidable that splashed gravy will e.g. pass onto the sealing edge or rim of the base of a shell pack, which then during the subsequent sealing of the top and base leads to a leak at the joint in question, which is unfavourable for the keeping quality or life of the meat product.

It has in particular been found that in the known procedure as a result of the heat treatment during subsequent sterilization occurring on sealing the container there is a detrimental effect on the appearance of the container content, because at the transition between the liquid gravy phase and the solid, lumpy phase there is a pasty transition zone, which makes the container content or the meat product sometimes appear as an unattractive, uniform mass, whereas it is in fact desirable for the lumpy nature of the meat product to be clearly visible on opening the container and with a pronounced separation between the liquid and solid phases. The same disadvantageous phenomenon occurs if the pack is not constituted by a solid container, but e.g. by a film or foil pack.

The problem of the invention is to so further develop the process of the aforementioned type that the lumpy state of the meat product is improved and the pack seal increased, whilst in particular ensuring low manufacturing and material costs.

According to the invention this problem is solved in that the meat material, comprising meat lumps and the gravy are compression moulded to a shaped article and the latter is fed in an at least surface-frozen state into the packing material.

The meat raw material in frozen form can be cut up into meat lumps and both the meat material formed therefrom and the gravy, whereby the latter is in granule form, are compression moulded to a shaped article in the frozen, solid and quasi-dry state and as such is introduced in the frozen, solid, quasi-dry state into the packing material.

In an embodiment of the invention, prefabricated meat or vegetable-based shaped portions are added to the meat lumps for forming the meat material.

The invention also proposes that the meat material and the sauce or gravy granules are kept at a temperature of approximately $-3°$ during compression moulding. The meat material and the gravy granules can be kept at a temperature of approximately $-5°$ during compression moulding.

According to the invention optionally the moulded article temperature on introduction into the packing material is below $-3°$ and preferably approximately $-5°$.

According to the invention the meat material and the gravy granules can be mixed with one another in the frozen, solid, quasi-dry state.

According to the invention, when using a container comprising a base and a top as a pack the shaped article is produced with external dimensions substantially precisely corresponding to the internal dimensions of the prefabricated base.

The invention also proposes that the compression moulding of the shaped article should take place within the prefabricated base.

According to the invention when using a container comprising a top and a base as a pack the base can be produced simultaneously during the compression moulding process used for producing the shaped article by compression moulding, deep drawing, etc.

According to another embodiment of the invention during the compression moulding process the shaped article is enveloped in substantially gas and/or liquid-tight manner with a plastics sleeve or the like.

According to the invention optionally a material is used for enveloping the shaped article which at a temperature suitable for sterilization is transformed into an ingredient of the meat product.

According to the invention, the container base filled with the shaped article is subject to a vacuum production process prior to closure.

Alternatively, the container base filled with the shaped article can be gassed with an inert gas such as $CO_2$, $N_2$, etc. prior to closure.

According to the invention it is also possible to proceed in such a way that the meat product and the gravy are sterilized prior to freezing and subsequently, whilst avoiding a subsequent sterilization of the filled pack, are further processed until substantially a gas and liquid-tight closure of the pack is obtained under sterile conditions.

According to another embodiment of the invention, after the production of a substantially gas and liquid-tight closure, the pack undergoes a subsequent sterilization using pressure and heat.

According to the invention the gravy granules can be produced in substantially oxygen-free manner from water and other condiments, such as spices, solids, etc. It is also possible to proceed in such a way that an inert gas, such as $CO_2$, $N_2$ or the like is used for producing the gravy granules.

According to another embodiment of the invention use is made of two-component gravy granules constituted by a dry component and ice crystals.

Finally the invention also relates to a meat product produced according to the process of the invention.

The invention is based on the surprising finding that it is possible to decisively improve the known process in the sense of the set problem, in that the lumpy ingredients, i.e. the solid phase of the meat product to be produced on the one hand and the liquid phase, i.e. the meat gravy on the other which, besides solid constituents can also contain water, are moulded together to form a moulded article preferably in the frozen, solid, quasi-dry state and optionally following corresponding mixing and when using a container comprising a top and a base this either precisely corresponds to the internal dimensions of a prefabricated base or is produced simultaneously therewith in the compression moulding process. The shaped article is preferably introduced in frozen form into the base, so that with correspondingly precise volume or weight dosing of the individual components, it is possible to ensure a precise spacing of the upper edge of the shaped article from the sealing edge or rim of the base or the like. This obviates any dirtying of the sealing rim or the like, because no liquid materials are filled into the base. Subsequently the top can be reliably connected to the base, whilst avoiding any foreign body influence.

According to the invention the product to be packed comprising the meat material and the gravy component in moulded form and either entirely or only surface-frozen is then introduced into the packing material and e.g. in the case of a film or foil pack it can also be provided that unlike in the case of a solid packing component such as the base of a container, the shaped article is not inserted in the particular packing component and is instead merely wrapped in the packing material, e.g. a packing film or foil and is then further processed to a substantially liquid and gas-light pack.

It has been found that by mixing the lumpy phase and the subsequently liquid, namely gravy phase in the frozen state, also after subsequent sterilization on opening the container the meat product has a much better lumpy appearance, which is attractive from the esthetic and taste standpoint, quite unlike the situation with the known procedure.

It is also advantageous that, according to the invention, optionally a substantially oxygen-free gravy granular product can be used, so that the oxygen content within the pack is reduced and therefore the keeping quality of the meat product can be improved. As a result of a suitable process it is possible to produce "snowflake-like" ice crystals, which ensure an ideal compression moulding process.

Further features and advantages of the invention can be gathered from the following description of an embodiment relative to the attached drawings, wherein show:

FIG. 1 An apparatus for performing an embodiment of the process according to the invention.

Figure 2A:
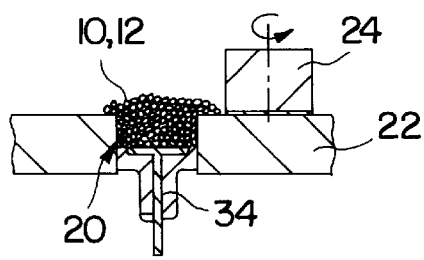
Figure 2B:
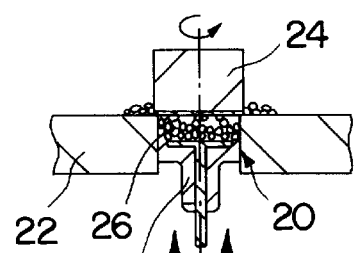
Figure 2C:
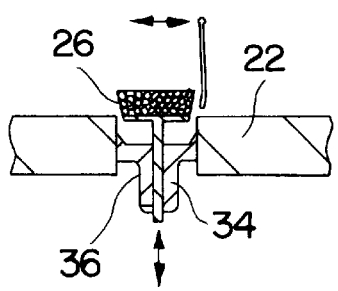
Figure 2D:
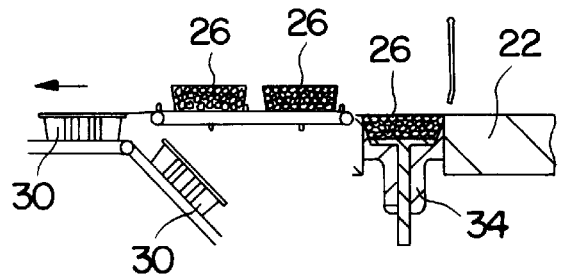

FIGS. 2a) to d) A detail of the apparatus of FIG. 1 in different stages of the described embodiment of the process according to the invention.

As is symbolically shown in FIG. 1 and hereinafter by an arrow or arrows, lumpy meat material 10 in the frozen state (i.e. at −4° C. in the selected embodiment) and which comprises meat lumps, vegetable ingredients, etc., as well as sauce or gravy in the form of granules 12, is fed into a buffer mixer 14, which is also at −4° C. From said buffer mixer 14 the meat material and gravy granules pass in the direction of the arrow 16 into a compression moulding means 18, which rotates at a speed of 450 r.p.m. and has a plurality of mould depressions 20, which are located in a rotary plate 22 rotating at the aforementioned speed and which cooperate with a rotating knife 24 circumferentially fixed relative to the plate 22.

The compression moulding means 18 is in a room or area with an ambient temperature of −4° C. The moulded articles 26 produced by the compression moulding means 18 pass through a temperature lock 28, are subsequently placed in the bases 30 of shell lacks supplied by a magazine 32 and then there is a distribution into three processing lines according to the embodiment of FIG. 1, in which the bases 30 are sealed by means of a corresponding covering foil or film constituting the container top.

As can be seen in FIG. 2, in stage a) of the inventive process the mixture of the meat material 10 and the gravy granules 12 at a temperature of −4° is filled into the mould depression 20 of the rotary plate 22 and naturally part of the filling is "heat" in the quasi-dry, solid state above the mould depression 20.

In stage b) the rotary knife 24 simultaneously serving as the female mould moves over the mould depression 20 and seals the latter at the top, cooperating with the rotary plate 22, so that the compression moulding operation is carried out by a male mould 34 which moves up and down and in this way the moulded article 26 can be produced.

In stage c) the moulded article 26, which is still in the frozen state and whose external dimensions almost precisely correspond to the internal dimensions of the base 30, is raised and this is brought about by an inner die 36 located in vertically displaceable manner within the male mould 34 and is transported away in the direction of the arrow. In stage d) the moulded articles 26 are successively brought together with the bases 30 and placed flush therein.

Although not shown in the drawings, this is followed by the sealing of the bases 30 with the shaped or moulded articles 26 located therein, e.g. by hot sealing with a cover film or the like.

Prior to the sealing of the bases 30 with the shaped articles 26 located therein, they can be alternatively subject to a vacuum production process or a gassing with an inert gas such as $CO_2$, $N_2$, etc.

The inventive features disclosed in the description, drawings and claims can be in both individual and combined form important for realizing the different embodiments of the invention.

We claim:

1. A process for producing a meat product comprising a substantially liquid sauce or gravy filled into a pack, said process comprising the steps of:

(a) cutting meat raw material into lumps;

(b) mixing said meat lumps with a sauce or gravy;

(c) compression molding the meat lumps and the sauce or gravy into a shaped article;

(d) introducing the shaped article into the packing material in an at least surface-frozen state; and (e) processing the packing material such that is forms a substantially liquid- and gas-tight pack.

2. The process of claim 1 further comprising the step of sterilizing the pack.

3. The process of claim 1 wherein the meat lumps and the sauce or gravy are compression molded in a frozen, solid, quasi-dry state.

4. The process of claim 3 wherein the sauce or gravy is in the form of granules.

5. The process of claim 4 wherein the meat lumps and the sauce or gravy granules are maintained at a temperature of approximately −3° C. or below during compression molding.

6. The process of claim 5 wherein the meat lumps and the sauce or gravy granules are maintained at approximately −3° C. to approximately −5° C. during compression molding.

7. The process of claim 5 wherein the meat lump and the sauce or gravy granules are maintained at approximately −4° C. during compression molding.

8. The process of claim 1 wherein the packing material is a container comprising a top and a prefabricated base and the shaped article is produced with external dimensions substantially corresponding to the internal dimensions of the prefabricated base.

9. The process of claim 8 wherein the compression molding step takes place in the prefabricated base.

10. The process of claim 1 wherein the packing material is a container comprising a top and a base, the base being produced in the compression molding process used for producing the shaped article simultaneously therewith.

11. The process of claim 1, wherein during the compression molding step the molding article is enveloped with a plastic sleeve or the like in a substantially gas- and/or liquid-tight manner.

12. The process of claim 11, wherein the sleeve is made of a material which, at a temperature suitable for sterilization, is transformed into an ingredient of the meat product.

13. The process of claim 1 wherein the packing material filed with the shaped article is subject to a vacuum production process prior to sealing.

14. The process of claim 1 wherein the packing material is gassed with an inert gas prior to sealing.

15. The process of claim 2 wherein the meat material and the sauce or gravy are sterilized prior to freezing, and subsequently are further processed under sterile conditions until a substantially liquid- and gas-tight closure of the pack is obtained.

16. The process of claim 2 wherein the pack is sterilized using pressure and heat subsequent to the step of forming a substantially liquid- and gas-tight pack.

17. A meat product prepared by the process comprising the steps of:
 (a) cutting meat raw material into lumps;
 (b) mixing said meat lumps with a sauce or gravy;
 (c) compression molding the meat lumps and the sauce or gravy into a shaped article;
 (d) introducing the shaped article into the packing material in an at least surface-frozen state; and
 (e) processing the packing material such that it forms a substantially liquid- and gas-tight pack.

18. The meat product of claim 17, wherein the sauce or gravy is in the form of granules.

19. The meat product of claim 18, wherein the granules are produced in a substantially oxygen free manner from water and condiments.

20. The meat product of claim 19, wherein the granules comprise a dry component and ice crystals.

21. The meat product of claim 17, further comprising prefabricated shaped articles having a meat or vegetable base.

* * * * *